(12) United States Patent  
Elkhouli

(10) Patent No.: US 8,790,010 B2
(45) Date of Patent: Jul. 29, 2014

(54) CEMENT BAGS

(75) Inventor: Ihab Abdalla Radwan Elkhouli, Mitgumer (EG)

(73) Assignee: ABTS GmbH—Advanced Bag Technology & Service GmbH, Rendsburg (DE)

( * ) Notice: Subject to any disclaimer, the term of this patent is extended or adjusted under 35 U.S.C. 154(b) by 681 days.

(21) Appl. No.: 12/596,505

(22) PCT Filed: Apr. 18, 2008

(86) PCT No.: PCT/IB2008/002203
§ 371 (c)(1),
(2), (4) Date: Oct. 19, 2009

(87) PCT Pub. No.: WO2008/139331
PCT Pub. Date: Nov. 20, 2008

(65) Prior Publication Data
US 2010/0254636 A1    Oct. 7, 2010

(30) Foreign Application Priority Data

Apr. 18, 2007  (DE) .......................... 10 2007 018 579

(51) Int. Cl.
*B65D 33/01* (2006.01)
*B65D 30/02* (2006.01)
*B65D 30/08* (2006.01)

(52) U.S. Cl.
USPC ............................... 383/102; 383/1; 383/116

(58) Field of Classification Search
CPC ....... A61F 13/512; B32B 27/12; B32B 27/36; B26F 1/26

USPC ............ 383/102, 109, 100, 101, 103, 116, 1; 156/252

See application file for complete search history.

(56) References Cited

U.S. PATENT DOCUMENTS

| | | | | |
|---|---|---|---|---|
| 3,929,135 A | * | 12/1975 | Thompson | 604/385.08 |
| 4,196,245 A | * | 4/1980 | Kitson et al. | 428/198 |
| 4,297,402 A | * | 10/1981 | Kinbara et al. | 383/119 |
| 4,348,445 A | * | 9/1982 | Craig | 428/138 |
| 4,592,941 A | * | 6/1986 | Emmons | 428/113 |
| 4,741,941 A | * | 5/1988 | Englebert et al. | 428/71 |
| 4,758,297 A | | 7/1988 | Calligarich | |
| 4,879,170 A | * | 11/1989 | Radwanski et al. | 442/329 |

(Continued)

FOREIGN PATENT DOCUMENTS

| | | |
|---|---|---|
| AT | 413 273 B | 1/2006 |
| EP | 0 080 144 A1 | 6/1983 |
| WO | WO-01/05574 A1 | 1/2001 |
| WO | WO-2005/012121 A1 | 2/2005 |

OTHER PUBLICATIONS

International Preliminary Report on Patentability dated Nov. 10, 2009, PCT/IB2008/002203.
Written Opinion dated Nov. 6, 2008 PCT/IB2008/002203.

(Continued)

*Primary Examiner* — Jes F Pascua
(74) *Attorney, Agent, or Firm* — Gifford, Krass, Sprinkle Anderson & Citkowski, P.C.

(57) ABSTRACT

The invention relates to a flexible bag for pourable construction material, particularly a cement bag, which is used for transporting and storing defined portions, preferably at least 15 kg to 50 kg, of the pourable material. The invention also relates to a method for producing said bag for construction material.

28 Claims, 5 Drawing Sheets

(56) References Cited

U.S. PATENT DOCUMENTS

| | | | | |
|---|---|---|---|---|
| 4,898,761 A | * | 2/1990 | Dunaway et al. | 428/137 |
| 4,948,639 A | * | 8/1990 | Brooker et al. | 428/35.2 |
| 5,080,702 A | * | 1/1992 | Bosses | 55/382 |
| 5,290,377 A | * | 3/1994 | Aihara et al. | 156/229 |
| 5,335,996 A | * | 8/1994 | Cortopassi et al. | 383/207 |
| 5,376,392 A | * | 12/1994 | Ikegami et al. | 426/127 |
| 5,393,379 A | * | 2/1995 | Parrinello | 162/101 |
| 5,399,422 A | * | 3/1995 | Dijkema et al. | 442/36 |
| 5,733,628 A | * | 3/1998 | Pelkie | 428/138 |
| 6,375,603 B1 | * | 4/2002 | Yuasa et al. | 493/256 |
| 2002/0098341 A1 | * | 7/2002 | Schiffer et al. | 428/323 |
| 2004/0074803 A1 | | 4/2004 | Otsubo et al. | |
| 2007/0259154 A1 | * | 11/2007 | Cree | 428/131 |

OTHER PUBLICATIONS

International Search Report dated Nov. 6, 2008 PCT/IB2008/002203.

* cited by examiner

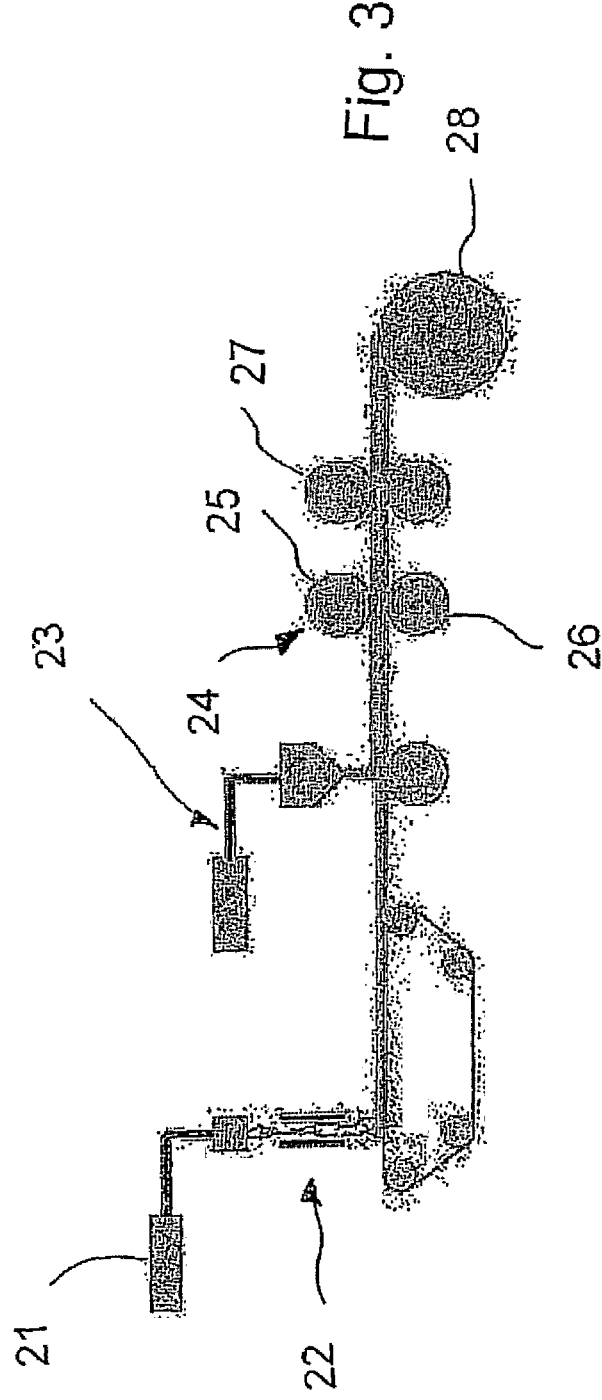
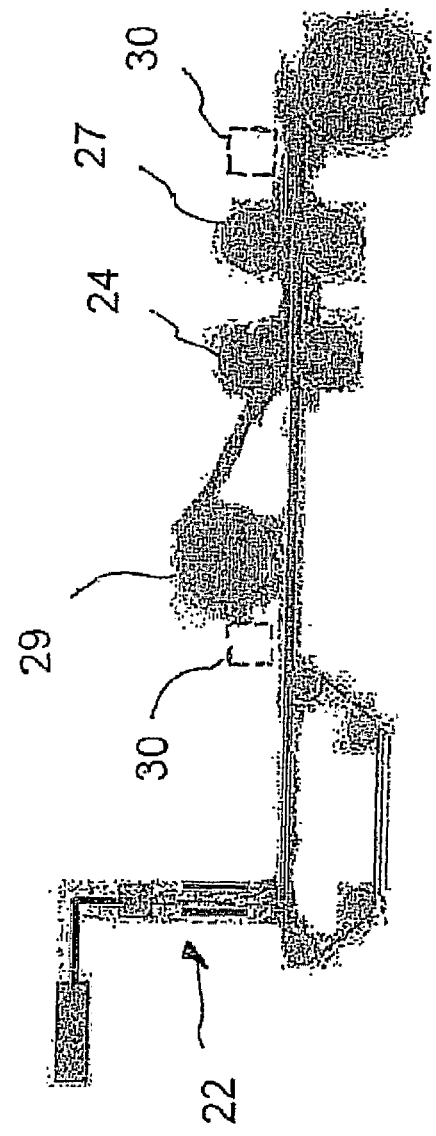

CEMENT BAGS

CROSS-REFERENCE TO RELATED APPLICATIONS

This application is the U.S. national phase of international patent application PCT/IB2008/002203 filed Apr. 18, 2008, which claims priority of German Patent Application 10 2007 018 579.2 filed Apr. 18, 2007.

FIELD OF THE INVENTION

The invention under consideration concerns a bag for construction material, in particular, flexible bags for pourable construction material, in particular, cement bags, for transporting and storing defined portions, preferably, of at least 15 kg to 50 kg of the pourable material.

BACKGROUND OF THE INVENTION

Various types of cement bags are known for transporting and storing cement in defined portions. Various bag constructions fulfill various points, wherein, depending on the field of application, cement composition, and environmental conditions, various demands can be made. Points, such as a sufficient mechanical strength, as a function of the size of the bag, a sufficient barrier against small particles (dust), so as to prevent a migration of the small components of the cement through the packaging material, sufficient barriers against moisture and/or a sufficient air permeability, so as to guarantee a pressure compensation during the filling and cooling of the cement bag, may play a role.

Depending on the specific requirements, various material concepts for bags are used for construction materials, which have different advantages and also disadvantages:

Simple bags that are made of one or more paper plies and are partially perforated so as to guarantee air permeability. This can be seen, for example, in German Patent Application Publication No. DE 36 13 749 A1. This concept has the lowest costs but also offers the difficulties of providing sufficient mechanical strength and protection from moisture. Nevertheless, the use of these materials due to the favorable price is still widespread. Also, there are further developments to enable the use of these so-called kraft papers with large bags, as can be seen in German Patent Application Publication No. DE 698 06 168.

Bags with one or more paper plies and a perforated plastic film. In comparison to the pure paper bags, this construction offers a clearly improved barrier for moisture/liquids. A corresponding bag which can be used for construction materials can be found in Austrian Patent Application Publication No. AT 413 273 B.

Bags made of woven plastic strips also exist, mostly produced from polypropylene, with a perforated plastic film as a barrier for liquids and dust. This construction offers a very high mechanical strength, resistance to water, and a high barrier function with regard to water. Therefore, these bags are frequently used in countries in which the mechanical stress is highest during transport and storage—for example, in the Arabic area. The costs for this material is, however, clearly higher, compared with the paper bags, because of the prices of polypropylene, in comparison to paper, and also the production of the woven bag. Several process steps are required, which are work-intensive, such as a production of the strip, a weaving of the strips to form a surface structure, a production of the perforated film, and a combination of the materials to form a surface structure consisting of several plies.

In International Application Publication No. WO 2005/012121, once again, one finds a cement bag that is intended to have a plastic ply and a carrier ply as a wall bonded with it, wherein the carrier ply can be a fabric and the plastic ply can be a hot-melt adhesive applied on the fabric, which is either perforated or porous. The wall should be gas-permeable and water-impermeable.

In German Patent Application No. DE 10 2004 013 469 A1, one can see a material combination of film and nonwoven, in which the nonwoven is used as the inner ply. As the outer ply, a film is used, which is air impermeable. The bag has an overlapping area of the film, in which an inner area of the film is perforated. A venting web, via which air should exit during the filling of the bag, is formed by a lateral airtight sealing of the overlapping. The outer ply itself is air- and water-impermeable outside the venting area. The bag thus formed is to be filled via a filling connection piece. The bag should be usable for cement, gypsum, cement- or gypsum-containing dry mixtures, meal, fodder, or other substances.

SUMMARY OF THE INVENTION

The goal of this invention is to create a bag for construction material that is simple to produce.

The goal under consideration is attained with a bag for construction material, in particular, a flexible bag for pourable construction material, in particular, a cement bag, for the transporting and storing of defined portions, preferably of at least 15 kg to 50 kg of the pourable material, wherein the bag for construction material has a laminate with at least one first and one second ply as the bag wall; the first ply is a film and the second ply, a nonwoven, which are bonded with one another, wherein an outer wall and an inner wall of the laminate are air permeable.

Surprisingly, it became evident that the use of a nonwoven and a film, which are, in particular, air permeable, make available a sufficient barrier effect for liquid. In this way, in particular, the capacity of the nonwoven to provide a high strength can be utilized, whereas the film is able to once again reinforce the barrier effect of the nonwoven. Preferably, a mono-ply film and a mono-ply nonwoven are used. However, multi-ply films or multi-ply nonwovens can also be used. Thus, for example, a pure spunbonded nonwoven (spunbond), a spunbond-melt-blown material, in the following called an SM material, in particular, an SMS material, is used as a preferred nonwoven material. Perforated films are a suitable embodiment of air-permeable films.

In accordance with another embodiment, the bag for construction material has an inner ply and an outer ply, each of which is air permeable. Preferably, the laminate forms at least one of the two plies, in particular, however, two plies. A refinement provides for the nonwoven to be placed outside and the film inside. Another refinement provides for the nonwoven to be placed inside, and the film outside. For example, the film can have a higher base weight than the nonwoven or vice-versa.

Preferably, the laminate is made in such a manner that the nonwoven makes available a higher strength than the film. For example, a provision can be made so that the nonwoven lengthens less than the film with the same force. It is preferred if, with the same load, the nonwoven extends less than the film, at least by a factor of 2, in particular, by at least a factor of 4.

A use of pure hydrophobic spunbonded nonwoven, for example, made from propylene, in cement bags is perhaps possible in only a very limited manner, since the fine hydrophilic dust components of the cement partially penetrate the spunbonded nonwoven and can hydrophilize the structure. In this way, a barrier function of the spunbonded nonwoven toward water is completely eliminated and a "sponge effect" appears, which absorbs the liquid and even promotes the passage of liquid. By the combination of nonwovens proposed here, especially a spunbonded nonwoven, with a permeable film, particularly a perforated film, it is possible, on the other hand, to make a very low-cost material for cement bags with good barrier properties, with respect to moisture and a high mechanical strength. Surprisingly, one obtains very good barrier properties if one perforates the film and the nonwoven with needles, simultaneously, wherein the needles puncture the material through the film in the direction of the nonwoven, and form cone-shaped openings that are stabilized by the nonwoven. Another embodiment provides for a punching, wherein preferably the punched material, in particular, the film, is advantageously not completely detached. Rather, in accordance with one embodiment, a provision is made so that an opening is created as a result of the punching which advantageously, however, closes once more—for example, under pressure, with the filling of the bags for construction material with bulk goods, in particular, with flowable material such as cement. A punching device can, for example, have stamps provided for this purpose which move into a punching matrix and thereby create an opening only partially.

In accordance with one embodiment, a permeability of the laminate is adjusted in such a way that particles with a diameter of more than 300 μm can no longer pass. In this way, it is possible to design the bag for construction material to be impermeable and in particular, for dust particles.

A permeable film can be produced in different ways. Thus, a filled film is produced, which is subsequently stretched. By means of the stretching, microperforations are created which bring about air permeability. The film is preferably stretched in the direction of the machine and also in the transverse direction. In this way, it is possible for the laminate to have a microporous film. For example, for this purpose, the film is filled with the filler by at least 20 wt %, in particular, however, at least 30 wt %, and advantageously, up to 50 wt %. By stretching, it is possible to also tear up predetermined breaking points previously introduced in the film material, which also make possible air permeability. A microporosity can additionally be provided—for example, with a film that has openings that can be closed.

If, for example, a mechanical perforation of the laminate is carried out with needles, then they advantageously bring about a penetration of the film into the nonwoven. The nonwoven fibers can thereby stabilize a configuration created by the perforation. In accordance with one development, a provision is made so that a cone-shaped perforation is extended from the film into the nonwoven. A refinement provides for the perforation to create a semipermeable membrane into which liquid does not penetrate the bag for construction material. Air, however, can escape from the bag for construction material. Furthermore, a provision can be made so that the perforations are microperforations.

A perforation can be made possible in various ways. In addition to a water jet perforation, a needle perforation can be carried out. There is also the possibility of perforation by the supply of energy, for example, in the form of ultrasound. A perforation, however, can also be carried out by an electron discharge. During the perforation, for example, not only the film but also the nonwoven and/or another ply can also be perforated. In accordance with one development, a provision is hereby made so that, in this way, a bonding is created between the plies. The bonding can be effected thereby by a force-locking and/or a form-locking mechanism. Thus, a hooking of materials of different plies into one another can take place, as well as a thermal cementing of these materials. For example, a thermoplastic multi-ply structure can be perforated as can be deduced from German Patent Application Publication No. DE 101 32 196 A1, which is herein incorporated by reference in its entirety.

In addition or alternative to a bonding of plies of the laminate among one another, a provision is made, in accordance with another development, so that the plies of the laminate are cemented to one another. A cementing can be carried out by a hot-melt application. The adhesive is sprayed on, for example, However, it can also be applied by rollers. The adhesive can be made available as particles, a liquid, as fibers, or in some other form.

Another embodiment provides for the laminate for the bag for construction materials to be produced in that the film is extruded onto the nonwoven. There is also the possibility that the nonwoven can be laid directly on a prefabricated film and bonded with this.

In order to make possible a marking of the bag for construction materials, a provision can be made to provide it with one or more labels. Likewise, it is possible to imprint the outside of the bag for construction material. Another possibility consists of imprinting a ply of the laminate, which is overlayered by an outside ply of the bag for construction material. For example, for this purpose, it may be advantageous if the ply is at least opaque. The ply can, for example, cover an imprinted film ply. It is also possible for the laminate or a ply thereof to have a relief. The relief can, for example, be done by an appropriate embossing. For example, the surface can be changed purposefully, in a sidewall of the bag for construction materials, in special areas, under the effect of heat. By means of such a relief formation, a special effect can be attained, in particular, with the assistance of an imprinting.

One refinement provides for the laminate to have a reinforcement, preferably, a grid material. The grid material can have a thermoplastic material. However, it can also be another plastic material. There is also the possibility of processing another high-strength grid material.

Preferably, the bag for construction materials has a laminate, which has an air permeability in accordance with EDANA Norm 140.1 of at least 20 L/m$^2$/s. This makes possible a filling of the bag for construction materials, without which air contained in a bag would not be able to escape.

A particularly tight bonding of the bag for construction materials is produced if a material of the nonwoven and material of the film are cemented, in particular, welded, with one another, at least by the effect of heat. For this purpose, a thermal bonding step can be utilized. However, the possibility of the hot extrusion of the film material effects at least a surface cementing, in particular, however, an at least partial penetration into gaps between the nonwoven fibers also.

It is preferable if at least the laminate is biodegradable. The nonwoven and/or the film can, for example, be made from the polymer based on starch and also from PLA.

The bag for construction materials can be folded, in particular, so it can roll and thus be flexible; the material, however, can also possess a rigid aspect so that the bag for construction materials, for example, retains its form even after filling it with the construction material and then emptying it.

In accordance with another embodiment of the invention, a method for the production of a bag for construction materials, in particular, a flexible bag for pourable construction material is proposed, in particular, for a cement bag, preferably a bag for construction materials described above, wherein an air-permeable but water-impermeable laminate is utilized, in which use is made of a nonwoven and a film.

One refinement provides for the production of a laminate with the method wherein when the bag for construction materials is not full, it is initially at least water vapor permeable, preferably, however, water permeable, and after the bag for construction materials is filled, however, it becomes water impermeable. The laminate can also become more or less vapor impermeable after filling. One refinement provides for the production of a laminate, which when the bag for construction materials is not filled, is initially at least water vapor permeable, perhaps also air permeable, preferably, however, water permeable, but after the bag for the construction materials is filled, however, at least water impermeable. Also, the laminate can be more or less vapor impermeable after the bag has been filled. A film can be used which after the filling closes its openings and preferably is no longer air permeable at all. Thus, for example, a shrinkage film can be used which, as a result of the effective heat of the poured-in cement, closes the contained openings by the effect of heat. Also, openings can be closed as a result of the funnel-like shape of the film, by the effective pressure of the cement.

Preferably, the laminate is further processed, wherein an inner surface of the bag for construction materials is formed by the film and an outer surface of the bag for construction materials, by the nonwoven. For example, a provision is made so that in a first station, the laminate is produced and in a second station, the bag for construction materials is produced from the laminate, wherein a transporting of the laminate takes place between the first and the second station within one operating site, and a filling of the bag for construction materials with the pourable material is carried out in a third station, wherein a large number of bags for construction materials are brought together for the automatic equipping for an automatic filling.

One refinement provides for the production of the spunbonded nonwoven in a first station by means of a spunbonded nonwoven unit, and is bonded with the film material in a laminating unit, wherein the production of the air permeability of the laminate follows.

Preferably, a perforation of the laminate is carried out with the effect of heat in the method wherein a needle perforation device is heated in an area of its needles to a temperature above the glass transition temperature, in particular, the melting point temperature of the film, and the glass transition temperature of the nonwoven. Devices with which a perforation can be carried out can be found, for example, in European Patent Application Publication No. EP 1 425 143 A1 and European Patent Application Publication No. EP 1 425 161 A1, which are both herein incorporated by reference in their entirety.

The laminate is perforated, for example, to a maximum diameter of the perforations of 2 mm. Another development provides for the laminate to be perforated to a maximum diameter of the perforations of 0.4 mm.

The method can, for example, be carried out in such a way that a nonwoven is used in which at least one first and one second polymer together form a nonwoven fiber, and wherein at least one of the two polymers is at least cemented, preferably welded, with a material of the film as the result of the effect of heat, wherein a stabilization of the funnel-shaped openings occurs.

Preferably, during the production of the laminate or in another step during the production of the bag for construction materials, a provision is made for openings to be formed in the laminate which close under the effect of pressure. Preferably, any openings present in the film close with an inner loading of the film by filling the bag for construction materials. During the filling of the bag for construction materials, there is preferably an excess pressure on its interior. Through pores or openings in the laminate, air can escape. Depending on the filling level of the poured-in cement, however, it is necessary for this purpose, for example, only that those pores or openings are still open which are not yet at the filling level of the cement but rather above it. By an appropriate orientation of configurations in the film and/or nonwoven, it is thus possible to influence whether they remain open, for example, or whether they can be closed by the cement. The openings can be partially closed, for example, by the pressing together of film material. For example, to this end, tube-like configurations can be formed in the film material. If they are laterally placed under pressure, they close. Such tubes, however, can also be produced without a perforation step. Thus, the film material can receive a volcano-shaped microsurface, by adhesion to a surface, in particular, to a roller. These micro-volcanos are hollow. The structures formed in such a way can also run cylindrically or in some other manner; in particular, they can jut out from a surface of the film material. There is also the possibility that, for this purpose, the film material can be introduced, in part, in particular, pressed in, into a matrix surface provided with corresponding negative configurations. Different possible basic structures of such a device can be deduced from German Patent Application Publication Nos. DE 198 43 109 A1, DE 101 02 501 A1, DE 100 35 597 A1, and/or DE 100 36 780 A1. In European Patent Application Publication No. EP 1 198 339 B1, various materials and devices, reference to additional state of the art in this regard, can be found; these publications and the state of the art mentioned there, are likewise incorporated by reference into the present disclosure in this respect. Such cones can extend from the inside to the outside also, in accordance with one refinement. This makes possible a closing, for example, at the latest with pressure from the outside, as with a storage of filled bags over one another and next to one another. The configurations themselves can be closed by the cement, if it penetrates the configurations and clogs them. For example, the cement can be introduced heated and bake firmly in the openings in this way. Thus, no cement can follow and the configuration becomes clogged.

It has proved to be preferable to produce the laminate only from one nonwoven ply and from only one film ply. The laminate preferably has a dynamic barrier property, whose effectiveness against water is more than >95%[sic], wherein the laminate also preferably has an air permeability, according to EDANA 140.1, of more than 20 $L/m^2/s$. The measurement methodology for determining the dynamic barrier property is described below in more detail:

Preferably, the laminate is provided with openings, wherein for the manufacturing, the perforated laminate is produced in one process step, by the combination of one nonwoven ply with a film extrusion unit, a calender, a needle perforation roller, and a winder. Preferably, the nonwoven unit is a spunbonded nonwoven unit. Another development with the perforation of the laminate provides for the calender to have a smooth roller directed toward the film and an engraved roller directed toward the nonwoven.

The bag for the construction materials can have one or more nonwoven units. For this purpose, the same type of nonwoven and also different types of nonwoven can be used. For example, a spunbonded nonwoven, a carded nonwoven, an SMS material, an air-laid material, a spunlaced material, a melt-blown material, an elastic nonwoven, a bicomaterial, and/or a nonwoven are used whose fibers or filaments have specific configurations, for example, are trilobal, or have other configurations, that in particular with regard to the transverse section, are not round.

A preferred embodiment of the bag for construction materials and its production provides for the use of a laminate with a weight per unit area of at least 30 g/m², in particular, at least 40 g/m², preferably between 40 g/m² and 150 g/m². At least one handle is preferably affixed, in particular, welded on, to a sidewall of the bag for construction materials. A material for the handle can be a spunbonded nonwoven with a weight per unit area of at least 70 g/m², preferably between 80 g/m² and 100 g/m².

As materials for the bag for construction materials, one can take into consideration, in particular, thermoplastic materials. The polymer used can be isotactic or atactic. In accordance with one embodiment, there is the possibility that the predominant component of the bag for construction materials is produced from polypropylene, a polypropylene-containing polymer, or a copolymer and also from a bicomponent or multicomponent material. Preferably, the bicomponent material has, at least in part, polyethylene on the entire surface, whereas in the interior, another polymer, preferably, polypropylene, is found. In this way, the polypropylene can make available a high strength, whereas the polyethylene is suitable for ensuring a particularly pleasant carrying comfort if the bag for construction materials is to be manually transported. On the other hand, the use of a polyethylene makes possible a better bonding with a similar film material. Preferably, the outside material of the fibers is at least coordinated with the film material of the laminate, and preferably, even coincides with it.

In accordance with another embodiment, a provision is made so that the laminate, the film, and/or the nonwoven have a material which comprises at least one of the following members of the group: PO, PET, a biodegradable polymer, PP, PE, a copolymer, an antimicrobial additive, a hydrophilically acting additive, a phosphorescent additive, a fluorescent additive, an antistatic additive, and a dirt-repellant additive.

One refinement provides for a nonwoven web to have an increased tear resistance by means of an embossing. An embossing area is preferably between 10% to 70% of the nonwoven web surface, in particular, between 15% and 30%, wherein, preferably, an individual embossing surface has a size between 0.05 mm² and 3 mm². An embossing is, in particular, such that a tear resistance of the nonwoven web is increased more in the MD direction than in the CD direction. To this end, for example, a provision is made so that a main axis of an embossing area is located in the CD direction.

An embossing, in particular, a thermal bonding, is preferably carried out by means of an embossing calender, which has corresponding elevations. For example, a smooth roller and an embossing roller form a calender slit, wherein at least one of the two rollers is heated to a temperature which, in particular, brings about a melting of the nonwoven introduced through the calender slit. In addition to an embossing by means of the effect of heat, there is, moreover, the possibility of being able to bring about a compression of the nonwoven by another suitable means, such as ultrasound, heat radiation, water-jet consolidation, and/or use of adhesives, such as adhesive fibers or something similar.

The laminate, in particular, the sidewalls opposite one another are bonded, especially, welded, with one another at least in one area. It has proved to be advantageous if in the area of a welding, preferably, with the setting up of an edge, at least the material there is a copolymer. The copolymer can have, for example, polypropylene and polyethylene. By using the copolymer, it is possible to bring about a better material bonding during the welding. Preferably, when using PP and/or PE, a frequency in a range between 10,000 Hz to 30,000 Hz is used with ultrasound welding, so as to introduce the energy into the material.

A bonding of the ends of a laminate can, for example, take place in an overlapping manner. For example, to this end, wide areas can be welded to one another. Another possibility is for edges located opposite one another to abut one another. For example, nonwoven material or polymer material can also be added, so as to make possible a joining together of the laminate. A joining of the laminate can, for example, be located in the area of a sidewall. There is, however, the possibility also that the joining is located in a transverse side of the bag for construction material. In accordance with another development, a provision is made so that in the area of a bottom, a laminate joining is or is not present. Preferably, to this end, for example, the laminate can be raised into a sidewall or a transverse side of the bag for construction materials, to such an extent that the laminate joining first occurs there. Moreover, there is also the possibility that the bag for construction materials has one or more areas where a laminate is used, which has a section in which only nonwoven or only film is present.

A joining to one another can, for example, take place by using a film material also. For example, the film can make available an additional polymer material, which is also used in the area of a seam formation. In addition to a welding, a cementing, as well as other bonding techniques can be used additionally or instead of the welding.

Moreover, a provision is preferably made so that, in particular, in the area of the joining of side edges to one another, for example, by welding, a higher expansion is provided than in another area of the laminate. For example, this can be provided by an appropriate formation of an embossing, or via an appropriate formation of a welding edge. The material used in the area of the welding edge can have a buffer or dampening effect. For example, the material used there is more elastic or expandable than in the other areas of the bag for construction materials.

Preferably, a seam or a material edge on the bag for construction materials does not run from one end to the other in a straight line. Rather, it has an undulating, zigzag structure, which changes its direction repeatedly, or other courses. In this way, a larger, in particular, longer seam or edge and thus a stronger bond is created.

In addition to a bond of one or more flat plies for the making of the bag for construction materials, the laminate is preferably coated either beforehand or subsequently. Moreover, there is the possibility of the nonwoven web having a barrier effect. For example, the nonwoven forms such a barrier that it is water vapor permeable and water impermeable, wherein the nonwoven web preferably has a water column of at least 200 mm, in particular, up to 1000 mm. In this respect, the nonwoven can, for example, be made as a melt-blown-spunbonded-nonwoven laminate. Preferably, the nonwoven is also adjusted with regard to air permeability in such a way that an air permeability lies in range between 100 to 5000 L/m²/s, preferably, between 1000 to 3000 L/m²/s.

Preferably, the bag for construction materials can also have a reinforcement at one or more sites or areas. An area can hereby be a holding area. In this, for example, a carrying aid, in particular, a handle or grip, can be located. Also, a reinforcement can be provided in an area of a bottom. For example, the reinforcement can be made with an insert, which is, in particular, also form-shaping for the bag for construction materials. The reinforcement can be flexible as well as rigid. It can consist of one or more layers. The material of the reinforcement can be a plastic, in particular, a polymer, from which the laminate and, in particular, the nonwoven is produced. Also, the laminate itself or a nonwoven can be utilized as a reinforcement. With a grip, a grip reinforcement, on the one hand, an area of a joining between the actual carrying bag and the grip, can be made available. For example, an additional material can be made available which makes possible a bonding with a material of the grip. Moreover, there is the possibility that the reinforcement prevents a tearing out of one or more grips. In this respect, the reinforcement can also be bonded with the grip and a sidewall of the bag for construction materials. There is also the possibility of providing a reinforcement in the area of an actual grip. Such a reinforcement can, for example, lie in a widening of the grip area, wherein a cutting in of the grips into a hand surface is avoided. In particular, a reinforcement is utilized also to make possible a widening of an accessible area for the grips for carrying and thus for supporting in one hand. To this end, the reinforcement can be made, for example, of cardboard, paper, foam, or the like.

For example, the method for the production of the bag for construction materials is carried out in such a way that the laminate is made available using the nonwoven web, wherein the laminate is folded in the MD direction of the nonwoven— this means in the machine direction, the production direction of the nonwoven in the machine- and sides of the laminate opposite one another are processed to form sidewalls of the bag for construction materials, wherein the laminate is processed in such a manner that the nonwoven extends from a bottom of the bag for construction materials to a filling opening, in the CD direction.

BRIEF DESCRIPTION OF THE DRAWINGS

The following figures show additional developments and features of the invention which, with the features described above, can be linked to refinements that are not described in more detail. The individual figures, however, are not to be interpreted in a restrictive manner. The details contained in the individual figures can also be linked with other features when they are detached from the individual development. The figures show the following:

FIG. 3, a second development of a unit for the production of the laminate;

FIG. 4, a supply of a nonwoven for the production of the laminate;

DETAILED DESCRIPTION OF THE INVENTION

Figure 1:
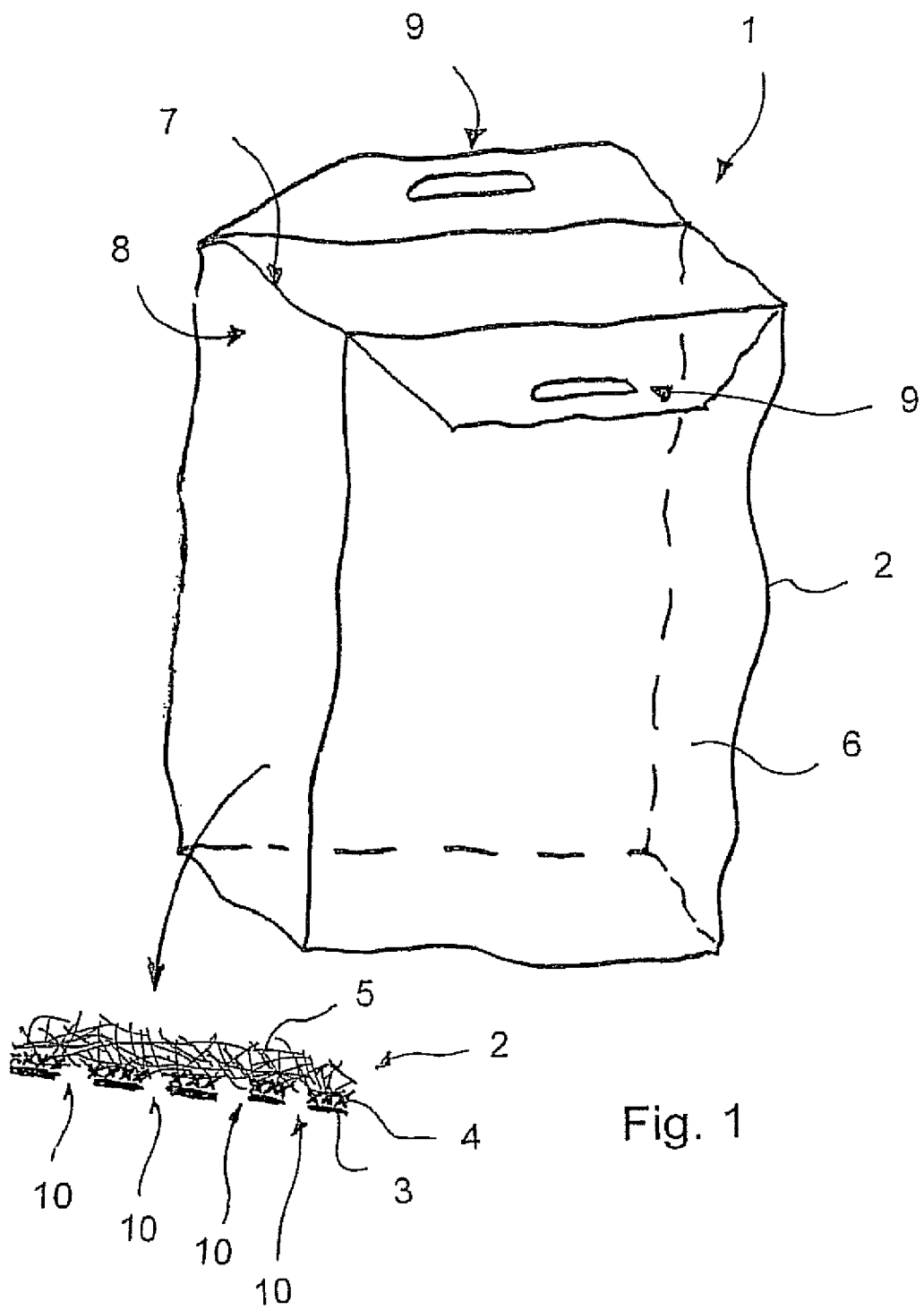
FIG. 1, a view, by way of example, of a first development of a bag for construction materials.

FIG. 1 shows a view, by way of example, of a first development of a bag for construction materials 1. The bag for construction materials 1 can, in particular, have a longitudinal extension, wherein it has a more or less rectangular parallelepiped shape. For the production of the construction material [sic] 1, a laminate 2 is used. Preferably, the bag for construction materials 1 is made exclusively from the laminate 2. A development of the laminate 2, by way of example, is shown, in enlarged form. Here, a first ply 3 made of a film material is present, which is bonded with a second ply 5, by means of a bond 4, shown in the form of crosses. The first ply is preferably a thermoplastic film. It can be formed, for example, three-dimensionally. The second ply is preferably a nonwoven, in particular, a spunbonded nonwoven. The first ply 3, as well as the second ply 5, is air permeable. The laminate 2 formed in this manner is thus, as a whole, also air permeable. Preferably, the laminate 2, at least, however, a ply thereof, has a water column that is at least 30 cm. The bonding 4 can, for example, be carried out by an adhesive layer, but also by a melting and an adhesion to one another of the first and second plies 3, 5. The laminate forms at least one bag wall 6 of the bag for construction materials 1 shown. Here, preferably, the film forms an inner ply 7, whereas the nonwoven forms an outer ply 8 of the bag for construction materials 1. The bag for construction materials 1 preferably has a grip area 9. This permits an improved, in particular, manual transporting of the bag for construction materials 1, especially if it is filled. The grip area 9 can be constructed in the most diverse ways. It can be present on a head end of the bag for construction materials 1, as shown. There is also the possibility of at least one grip area being present on two opposite longitudinal sides of the bag for construction materials 1. There can, however, also be a grip area on a transverse side of construction material bag 1. The grip area is preferably produced from the laminate 2 also. In this respect, the grip area 9 can also have an additional reinforcement. The laminate 2 is preferably air permeable in the entire used area of the bag for construction materials 1. In this respect, one or more openings 10 can be present in the film. The openings 10 can be formed by perforation but also by microporosities. If perforations are produced, they are located in a regular pattern in accordance with one development. In accordance with another development, the perforations are irregular. Moreover, the openings can also extend due to the bond 4 and the bonded nonwoven. It is, for example, attained by a perforation, which goes through all plies. However, in accordance with another development, only the film can have such openings, wherein an air permeability of the nonwoven is ensured by the material characteristics of the nonwoven.

Figure 2:
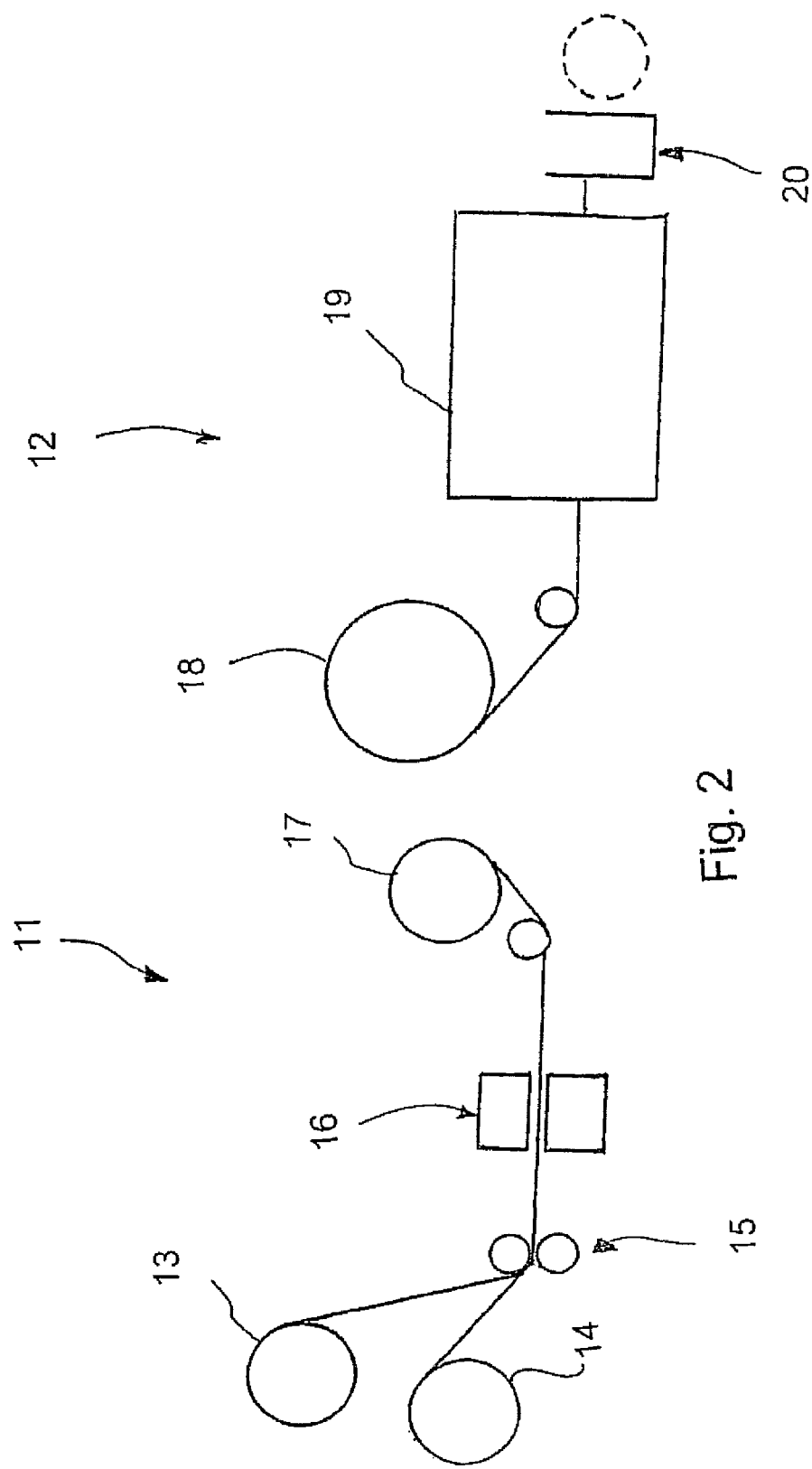
FIG. 2, a first development, by way of example, of a first and a second station for the production of a laminate, which is used for the production of the bag for construction materials.

FIG. 2 shows a first embodiment, by way of example, of a first station 11 and a second station 12, by means of which a laminate and a bag for construction materials is produced. In the first station 11, the laminate is produced. In the shown embodiment, an interstratification of the material produced takes place. This is subsequently further processed in the second station 12, to form a bag for construction materials. In accordance with this embodiment example, the first station 11 has a first winder 13 and a second winder 14. From the first winder, a first nonwoven is supplied; from the second winder 14, a film material. They are conducted to a first calendering unit 15. There, for example, a bonding of the plies conducted together can take place under the influence of heat. In a subsequent processing unit 16, for example, the laminate can be perforated. In this respect, a needle roller calender, a waterjet perforation, or another suitable device can be used. Thus, as shown, the entire laminate is perforated in the first station 11. The perforation can, in particular, be carried out in such a way that a stabilization, preferably of a three-dimensional configuration, which is, for example, cone-like, takes place by an interpenetration of the materials. Subsequently, the laminate perforated in this manner is wound on a winder 17.

A perforated laminate roll produced in such a manner can then be stored in an intermediate storage unit. The production of the bags for construction materials can take place by using a laminate roll produced in such a manner in a production apparatus for bags for construction materials, as it is shown, only in a schematic, alluded-to form, as the second station 12. A laminate roll 18 continuously makes available the material for further processing in a bag production apparatus 19. From there, the bags for construction materials produced are made available in an intermediate storage unit form 20. The bags for construction materials can be placed, for example, in a carton, separately from one another and/or, however, at least partially bonded with one another. There is also the possibility of being able, during a bonding of the bags for construction materials, with one another, to roll them, as is alluded to by the broken-line roller. An advantage of such a first and second station 11, 12 is that the individual special operation can take place continuously. A disturbance in this continuous operation can be captured for the subsequent operation in that as a result of an intermediate storage of the necessary material, buffer times can be created by a corresponding intermediate storage. Therefore, if a continuously running station can be forcibly stopped in its operation, one or more subsequent stations can nevertheless be further operated. It is particularly advantageous if such stations are placed together on one operating site, in particular, even in one hall-type building, if they are subject to the same regulations, in particular, hygiene regulations and requirements as to the cleanliness of the production. In this way, long starting times and also decontaminations of the material can be avoided.

FIG. 3 shows a second embodiment of a unit for the production of the laminate. Here, via an extruder 21, polymer material for the spunbonded nonwoven apparatus 22 is melted. The extruder 21 can be an individual or also a double extruder. There is also the possibility of supplying the additives to the extruder if this does not take place by a corresponding compounding of the polymer material. A double extruder makes possible the production of, in particular, bicomponent materials, preferably, core jacket fibers. The spunbonded nonwoven apparatus 22, shown by way of example, can be a spunbonded nonwoven unit. Such units are made available as turn-key units by various manufacturers. Manufacturers can hereby be the companies Neumag, Reifenhaeuser, STP Impianti, and also others. The spunbonded nonwoven apparatus 22 can, however, also be replaced by another nonwoven production apparatus, such as a carding unit or the like. The thickness of the filaments or fibers and also the grammage of the nonwoven ply and thus, in particular, characteristics such as air permeability and water column, are adjusted by the operation of the spunbonded nonwoven apparatus 22. In accordance with the unit proceeding from FIG. 3, the unconsolidated nonwoven is laid on a wire cloth and subsequently conducted to a film extrusion unit 23. Material is thereby also melted via an extruder and then applied on the unconsolidated nonwoven. In this polymer coating, there is at least an adhesion of the supplied film, which is either still liquid or still greatly heated, so that nonwoven fibers and film are at least adhered to one another, perhaps also melted with one another. The laminate formed in this way is subsequently solidified in a thermal bonding calender 24. Here, it is advantageous that a smooth roller 25 presses against the film and an embossing roller 26, against the nonwoven. The film-nonwoven laminate, consolidated in this way, is subsequently conducted to a perforation unit 27. As is alluded to schematically, it is preferable if the perforation unit is a needle roller calender device. The needle roller is preferably heated, wherein above it, the needle surfaces can be tempered. The temperature can be adjusted to the used polymer material of the nonwoven and/or the film. Preferably, the needles puncture the film side, in order to create, in this manner, a cone structure directed into the nonwoven ply. Fibers of the nonwoven are hereby reoriented during the perforation, without thereby being damaged by the perforation process. If, for example, a needle surface temperature is adjusted in such a manner that an exceeding of a glass transition temperature of the nonwoven polymer occurs, the nonwoven forms a support structure for the cone-shaped opening of the film, directed into the nonwoven, which, in turn, is of importance for a barrier effect toward the liquid. In accordance with one development, therefore, a provision is made so that the polymer material of the film melts at a higher point than the polymer material of the nonwoven. In accordance with another embodiment, a provision is made so that the polymer material of the film melts at a lower point than the polymer material of the nonwoven. In this way, it is possible to purposefully select which of the two plies is to create support for the other ply by a corresponding melting and, in particular, adhesion of the various structures. The advantage of the unit represented in FIG. 3 is a continuous production process, since by a sufficient resupplying of the starting granules for the production of the nonwoven and the film, such a unit can be operated around the clock without interruption. Following the perforation unit, a winding unit 28 is provided. This preferably has an automatic changer, so that a roller change can take place without interrupting the production process of the laminate.

FIG. 4 shows a supply of a nonwoven in a semi-inline process, using prefabricated film rolls. A spunbonded nonwoven apparatus 22 continuously produces a nonwoven. A film material is made available via a winding unit 29. Subsequent processing stations, such as a thermal bonding calender 24 and a perforation unit 27 can follow. In addition to this embodiment, there is also the possibility of continuously producing the film ply, whereas the nonwoven is made available via a corresponding winding unit. The unit structure itself makes possible the interposition of additional processing units 30. They are alluded to with broken lines and can be used at various positions in the unit. Processing units can, for example, apply coatings, produce an embossing of the material, wet and dry the material, or change, in other ways, the chemical, physical, or configuration structure of the ply or the laminate.

Figure 5:
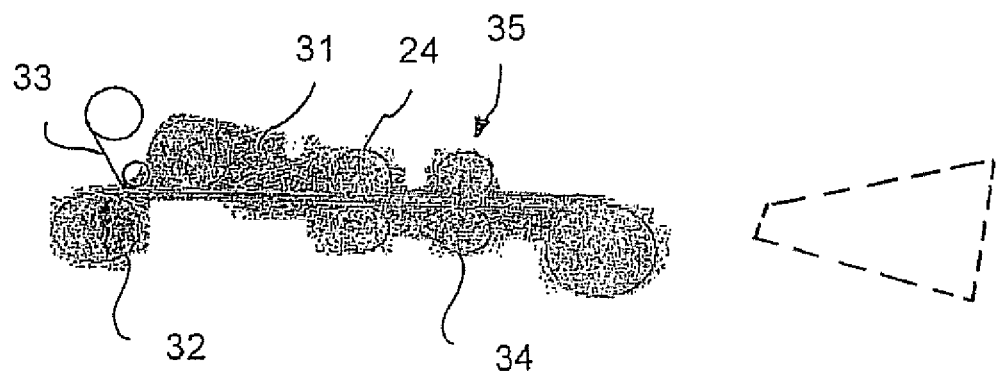
FIG. 5, a supply of a preperforated material, which is subsequently converted into a laminate.

FIG. 5 shows a supply of a preperforated material, which is subsequently converted into a laminate. In this respect, for example, a reinforcement ply 33 is supplied between a preconsolidated nonwoven 31 and a preperforated film 32. The reinforcement ply can be an additional nonwoven ply or, in particular, a grid also. The grid can create, in particular, a high strength for the laminate formed in this manner. Preferably, the grid is made of a polymer material, so that it can be bonded with the individual two other plies, in a thermal bonding step, as is alluded to by the thermal bonding calender 24. By the additional supply of heat, for example, in the form of a smooth roller calender 34, the laminate and its plies can be better bonded by a corresponding heating of the materials to at least an adhesion temperature. Subsequently, the material is rolled up and is made available for further processing. The unit structure that can be deduced from FIG. 5 can, however, also provide for the film ply not to be preperforated. Rather, the film ply can also be a film filled with a filler. As a filler, the possibilities are chalk or similar material. Thus, for example, after passing through the thermal bonding calender 24, instead of the smooth roller calender 34, a so-called ring-roll calender 35 can be provided. In this method, the laminate is preferably stretched at least in one direction, in particular, however, in the CD and also in the MD direction. There will be tears thereby in the bonding between the film material and the polymer material of the film, wherein the film ply will be air permeable. The ring-roll calender can have, for this purpose, a disk-like structure, wherein the disks mesh into one another. Also, the rollers opposite one another can have positive/negative structures with different depths and heights; intermittently, the material is partially held and intermittently, it is stretched. Moreover, there is also the possibility that a prestretched film is utilized in the unit. If a stretching is carried out only after the lamination, for example, by corresponding stretching frames 36, [shown with] broken lines, the nonwoven is preferably cemented with the film material. By the stretching, an adhesive layer tears hereby, if it was not applied discontinuously or continuously. In this way, air-permeable areas also form in this bonding.

Figure 6:
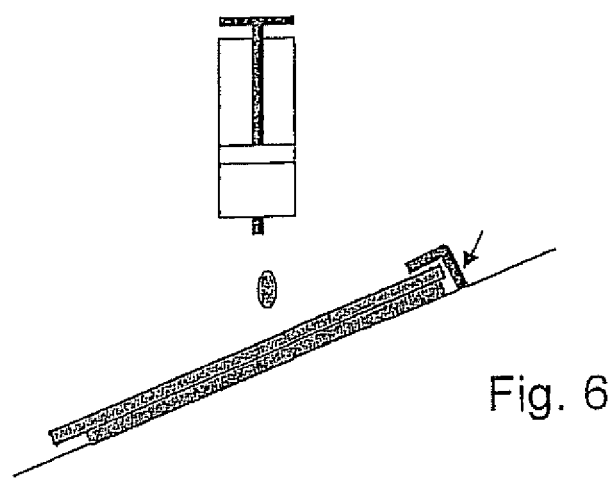
FIG. 6, a determination of a dynamic barrier of the laminate.

FIG. 6 shows a possibility of a measurement method for the determination of the dynamic barrier toward liquids. In accordance with FIG. 6, drawing a), the specimen, with the dimensions 15 cm×15 cm, is affixed to a plate, with the dimensions 20 cm×20 cm, on which an absorbent filter paper is affixed in the middle with the dimensions of 14 cm×14 cm, wherein only the upper edge of the specimen is firmly clamped on the filter paper in order to prevent its sliding, wherein the substrate has an angle of inclination of 30°. The specimen projects over the filter paper on the lower end by 1 cm. Care should be taken that the specimen is in direct contact with the filter paper.

By means of a piston or a syringe with an opening of 0.5 mm, 1 cm$^3$ distilled water is dripped onto the specimen from a height of 10 cm in the middle, wherein the advance of the piston is adjusted in such a manner that individual drops are loosened. This process is repeated at 4 points of the specimen, which, in each case, have a distance of at least 1 cm to one another, so that all total, 4 cm$^3$ distilled water are dripped onto the specimen. In the execution of the experiment, care should be taken that the filter paper is not wetted by the water running off (the specimen must project over the filter paper, at the lower end, by at least 1 cm).

By weighing the filter paper before and after dripping the water, the fraction of the water which has penetrated the specimen is determined. The dynamic barrier is defined as the result from:

$$(a-b)/a*100$$

with a=total quantity of the test liquid [g] (4 cm$^3$ corresponds to 4 g)
b=weight increase of the filter paper (quantity of the penetrated liquid [g]

Figure 7:
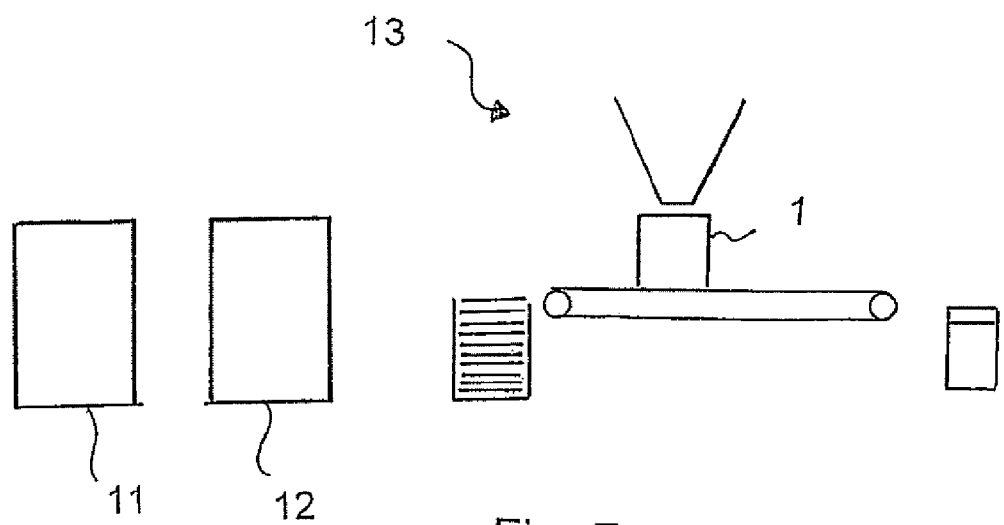
FIG. 7, another unit for the production and filling of a bag for construction materials.

FIG. 7 shows, in a schematic view, another unit for the production and filling of a bag for construction materials. Schematically, the first station 11 and the second station 12 are shown. A third station schematically shows, by way of example, a filling of the bag for construction materials 1. An advantage of the used laminate 2 is hereby that an antistatic coating or an antistatic additive can be used. Since very fine-grained powder is also introduced during the filling of the bag for construction materials 1, the use of antistatics permits an improved filling behavior. Moreover, unwanted electrostatic charging in unit areas is thereby avoided. After the filling of the bag for construction materials, it is closed. Preferably, a closing takes place automatically also. The laminate 2 makes possible different ways of producing the bag for construction materials 1. A closing and also a configuration deformation can take place thereby by means of cementing, welding, or in other ways.

Figure 8:
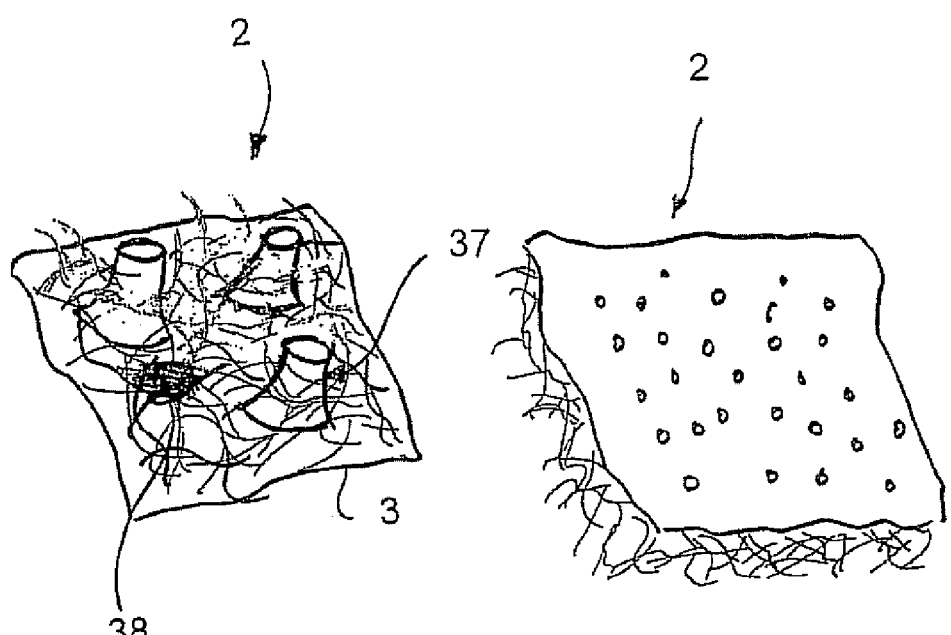
FIG. 8, a schematic view, by way of example, of a surface of a laminate.

FIG. 8 shows two possibilities for designing the laminate to be air permeable. Whereas the left depiction of FIG. 8 shows a laminate 2, in which in the first ply 3, perforations have led to volcano-like configurations 37, which are directed from the film to the nonwoven, a right laminate has microperforations, which are schematically alluded to. Perforations need not automatically lead to volcano-like configurations 37 or comparable protuberances of the film material. Rather, the film material can remain more or less planar after a perforation. A bonding of the plies of the laminate 2 takes place also, for example, by means of meltings, adhesions, or also weldings, as is alluded to, for example, by a thermal bonding area 38. The thermal bonding area 38 consolidates, on the one hand, the nonwoven, and creates, on the other hand, a bonding of the nonwoven ply with the film ply. It can take place by a mutual surface adhesion and also by a melting into one another.

It is claimed:

1. A cement bag for pourable cement, the cement bag for cement comprising:
    a cement bag wall formed of a laminate having a first inner layer and a second outer layer, the cement bag wall defining a storage space for the pourable cement, the first inner layer having a first exterior surface and an opposite first interior surface, the second outer layer having a second exterior surface and an opposite second interior surface,
    the first exterior surface being bonded with the second interior surface, and the first interior surface defining the storage space, and the second exterior surface defining an exterior of the cement bag wall,
    the first inner layer being formed of an air permeable film material and the second outer layer being formed of an air permeable nonwoven material,
    wherein the laminate is air permeable perforated, and wherein a perforation effects a penetration of the film material into the nonwoven material, wherein nonwoven fibers thereby stabilizing the configuration created by the perforation,
    wherein perforation creates a semipermeable membrane in which liquids do not penetrate into the cement bag, but air can escape from the cement bag.

2. The bag for construction materials according to claim 1, wherein the pourable construction material is a cement material.

3. The bag for construction materials according to claim 2, wherein the flexible bag holds at least 15 kg to 50 kg of pourable construction material.

4. The bag for construction materials according to claim 1, wherein a cone-shaped perforation extends from the film material into the nonwoven material.

5. The bag for construction materials according to claim 1, wherein the perforations are microperforations.

6. The bag for construction materials according to claim 1, wherein the first inner layer is formed of a microporous film material.

7. The bag for construction materials according to claim 1, wherein openings are present in the laminate which close when using the bag for construction materials with the effect of pressure.

8. The bag for construction materials according to claim 1, wherein openings present in the film material close with an outside stress on the bag for construction materials with the effect of pressure.

9. The bag for construction materials according to claim 1, wherein the first inner layer and the second outer layer of the laminate are cemented to one another.

10. The bag for construction materials according to claim 1, wherein the film material is extruded onto the nonwoven material.

11. The bag for construction materials according to claim 1, wherein the nonwoven material is at least opaque.

12. The bag for construction materials according to claim 1, wherein the laminate has a reinforcement formed of a grid material.

13. The bag for construction materials according to claim 1, wherein the laminate has an air permeability, according to EDANA Norm 140.1, of at least 20 L/m$^2$/s.

14. The bag for construction materials according to claim 1, wherein the nonwoven material and the film material are welded, with one another by the effect of heat.

15. The bag for construction materials according to claim 1, wherein the laminate is provided with a marking which is printed and/or profiled.

16. The bag for construction materials according to claim 1, wherein at least the laminate is biodegradable.

17. A method for the production of a flexible bag for pourable construction materials, in particular, a cement bag, preferably according to claim 1, the method comprising an air permeable but water-impermeable laminate is used as at least the sidewall of the bag of construction materials, and wherein a nonwoven and a film are used in the laminate.

18. The method according to claim 17, characterized in that a laminate is produced, that when the bag for construction materials is not filled, it is initially at least water vapor-permeable, preferably, however water-permeable, but after filling the bag for construction materials is water-impermeable.

19. The method according to claim 17, characterized in that the laminate is further processed, wherein an inner surface of the bag for construction materials is formed by the film and an outer surface of the bag for construction materials, by the nonwoven.

20. The method according to claim 17, characterized in that in a first station, the laminate is produced and from the laminate, the bag for construction materials is produced in a second station, wherein a transport of the laminate takes place between the first and the second stations within one operating site, in particular, one building, and a filling of the bag for construction materials with the pourable material, in a third station, wherein a large number of bags for construction materials are brought together for the automatic equipping of an automatic filling in the third station.

21. The method according to claim 17, characterized in that in a first station, a spunbonded nonwoven is produced by means of a spunbonded nonwoven apparatus and is bonded with a film material in a laminating unit, wherein the production of an air permeability of the laminate follows.

22. The method according to claim 17, characterized in that a perforation of the laminate is carried out under the effect of heat, wherein a needle perforation device is heated, in an area of its needles, to a temperature above the melting point temperature of the film and the glass transition temperature of the nonwoven.

23. The method according to claim 17, characterized in that the laminate is perforated to a maximum diameter of the perforations of 2 mm.

24. The method according to claim 22, characterized in that the laminate is perforated to a maximum diameter of the perforations of 0.4 mm.

25. The method according to claim 17, characterized in that a nonwoven is used in which at least one first and one second polymer, together, form a nonwoven fiber and wherein at least one of the two polymers is at least cemented, preferably welded, with a material of the film as a result of the effect of heat, wherein a stabilization of the funnel-shape openings takes place.

26. The method according to claim 17, characterized in that openings are formed in the laminate which preferably close under the effect of pressure.

27. The method according to claim 26, characterized in that openings present in the film close with an outside stress on the bag for construction materials.

28. The method according to claim 26, characterized in that openings in the bag for construction materials close when the bag for construction materials is filled.

* * * * *